United States Patent
Helland et al.

(10) Patent No.: US 8,168,274 B2
(45) Date of Patent: May 1, 2012

(54) POLYETHYLENE FILM WITH IMPROVED PROCESSABILITY AND MECHANICAL PROPERTIES

(75) Inventors: Irene Helland, Porsgrunn (NO); Svein Stall Eggen, Langangen (NO); Remko van Marion, Vienna (AT)

(73) Assignee: Borealis Technology Oy (FI)

( * ) Notice: Subject to any disclaimer, the term of this patent is extended or adjusted under 35 U.S.C. 154(b) by 452 days.

(21) Appl. No.: 11/918,106

(22) PCT Filed: Mar. 29, 2006

(86) PCT No.: PCT/EP2006/002868
§ 371 (c)(1),
(2), (4) Date: Dec. 19, 2007

(87) PCT Pub. No.: WO2006/108512
PCT Pub. Date: Oct. 19, 2006

(65) Prior Publication Data
US 2009/0053495 A1     Feb. 26, 2009

(30) Foreign Application Priority Data
Apr. 12, 2005 (EP) .................................... 05007986

(51) Int. Cl.
*B29D 22/00* (2006.01)
(52) U.S. Cl. ..... 428/35.7; 428/220; 428/35.2; 428/35.5; 525/240; 525/191; 526/352
(58) Field of Classification Search .................. 428/220, 428/34.1, 35.2, 35.5, 35.7, 36.92; 525/240; 525/191; 526/352
See application file for complete search history.

(56) References Cited

U.S. PATENT DOCUMENTS

| 6,248,831 | B1 * | 6/2001 | Maheshwari et al. ........ 525/191 |
| 6,458,911 | B1 * | 10/2002 | Ong et al. .................. 526/348.1 |
| 6,632,884 | B1 | 10/2003 | Skar et al. |
| 2002/0045711 | A1 * | 4/2002 | Backman et al. ............. 525/240 |

FOREIGN PATENT DOCUMENTS

| EP | 0 517 868 | 11/1995 |
| EP | 0 810 235 | 11/2004 |
| EP | 1 333 044 | 1/2005 |
| WO | WO 96/18662 | 6/1996 |
| WO | WO 97/44371 | 11/1997 |
| WO | WO 00/22040 | 4/2000 |

OTHER PUBLICATIONS

International Search Report for International Application No. PCT/EP2006/002868.
Heino, E.L., *Rheological characterization of polyethylene fractions,* Theoretical Applied Rheology, Proc. XIth Int. Congr. on Rheology, Aug. 1992, 1992 Elsevier Science Publishers B.V.
Heino, E.L., *The influence of molecular structure on some rheological properties of polyethylene,* Annual Transactions of the Nordic Rheology Society, vol. 3, 1995.

* cited by examiner

*Primary Examiner* — Angela Ortiz
*Assistant Examiner* — Ruiyun Zhang
(74) *Attorney, Agent, or Firm* — Fay Sharpe LLP

(57) ABSTRACT

The present invention relates to a film comprising at least one layer comprising an ethylene homo- or copolymer which has a complex viscosity at 5 kPa shear stress eta5 of 200,000 or less and a shear thinning index SHI(5/300) measured at 190° C. as the ratio between the complex viscosity at 5 kPa shear stress and the complex viscosity at 300 kPa shear stress of 120 or more.

19 Claims, No Drawings

POLYETHYLENE FILM WITH IMPROVED PROCESSABILITY AND MECHANICAL PROPERTIES

The present invention relates to a polyethylene film, in particular to a polyethylene film with improved processability and mechanical properties. Furthermore, the invention relates to the use of an ethylene homo- or copolymer having a particular shear thinning behaviour for the production of such a film.

For polyethylene resins used for the production of films, the combination of good processability and good mechanical properties is a demand. However, it is difficult to achieve such a combination because, for example, when the molecular weight of the resin is decreased which is known to improve processability by e.g. decreasing the film line pressure, the mechanical properties such as the dart drop are influenced in a negative way.

Polyethylene resins for film applications today often comprise at least two polymer fractions which differ in their molecular weight. It is known that the presence of a lower molecular weight fraction improves the processability of the resin whereas the presence of a higher molecular weight fraction ensures good mechanical properties. However, in such bi- or multimodal resins the appearance may be negatively affected, caused e.g. by the formation of gels which is indicative for a lower degree of homogeneity of the final resin.

It is thus an object of the present invention to provide a polyethylene film comprising an ethylene homo- or copolymer, wherein the polymer has improved processability so as to facilitate film production, a high degree of homogeneity so that at least an acceptable amount of gels is obtained, and, simultaneously, yields a film with improved mechanical properties, especially impact strength.

It has now been surprisingly found that by providing an ethylene homo- or copolymer having a comparatively low complex viscosity at 5 kPa shear stress and a high shear thinning index, the above object can be achieved and the required properties can be obtained simultaneously.

The present invention therefore provides a film which comprises at least one layer comprising an ethylene homo- or copolymer which has a complex viscosity at 5 kPa shear stress eta5 of 200,000 or less and a shear thinning index SHI(5/300) measured at 190° C. as the ratio between the complex viscosity at 5 kPa shear stress and the complex viscosity at 300 kPa shear stress of 120 or more The film of the present invention exhibits improved mechanical properties as can be seen e.g. from the dart drop values which indicate good impact strength. At the same time, the film production by extrusion is facilitated because e.g. a lower pressure and temperature is necessary for extruding the film. Finally, the film shows good homogeneity, i.e. low gels content.

By ethylene copolymer is meant a polymer the majority by weight of which derives from ethylene monomer units. The comonomer contribution preferably is up to 10% by mol, more preferably up to 5% by mol, and may derive from other copolymerisable monomers, generally $C_{3-20}$, especially $C_{3-10}$, comonomers, particularly singly or multiply ethylenically unsaturated comonomers, in particular $C_{3-10}$ α-olefins such as propene, but-1-ene, hex-1-ene, oct-1-ene, 4-methyl-pent-1-ene etc.

In a preferred embodiment of the film according to the invention, the ethylene homo- or copolymer has a complex viscosity at 5 kPa shear stress eta5 of 180,000 or less, more preferably of 170,000 or less.

Furthermore, the ethylene homo- or copolymer preferably has a SHI(5/300) of 130 or more, more preferably 150 or more, still more preferably of 170 or more and most preferably 200 or more.

Preferably, the ethylene homo- or copolymer used in the film of the present invention has a melt flow rate $MFR_5$ of at least 0.1 g/10 min, more preferably at least 0.15 g/10 min, still more preferably at least 0.18 g/10 min, and most preferably at least 0.20 g/10 min.

Furthermore, the ethylene homo- or copolymer used preferably has an $MFR_5$ of 0.5 g/10 min or less, more preferably 0.4 g/10 min or less, still more preferably 0.35 g/10 min or less, and most preferably 0.30 g/10 min or less.

The impact strength characterizes the material behaviour at a high speed loading (impact). Pendulum and falling weight type testers are applied here. Specimen can be either plaques, notched or unnotched bars or parts of finished products. There are several methods like "Charpy impact test", "Izod impact test", "tensile impact test", "instrumented puncture test" and the "dart drop test". Generally, an impact test shows the energy which is needed to break or puncture specimen under specified conditions. By the dart drop test, the dart drop value is determined to verify the impact strength of a film. A free-falling dart of specific weight and geometry is therefore from a specified height dropped onto a film. The weight at which 50% of the film samples break is reported as the dart drop value. All dart drop values are measured by method ISO 7765-1.

In a preferred embodiment, the film has a dart drop value of more than 200 g, more preferably more than 250 g, and still more preferably 300 g, if the film is extruded on an Alpine film line into a thickness of 15 micrometer with a die diameter of 160 mm, a die gap of 1.5 mm, a blow-up ratio BUR of 4:1 and a neck height of 8× die diameter.

Furthermore, the film preferably has an Elmendorf tear strength in the machine direction (MD) of at least 0.09, more preferably at least 0.01 and most preferably at least 0.11.

Still further, the film preferably has an Elmendorf tear strength in the transverse direction (TD) of at least 0.8, more preferably at least 0.98 and most preferably at least 1.0.

Preferably, the ethylene homo- or copolymer used in the film of the present invention has a density of 940 kg/m³ or higher, more preferably is 943 kg/m³ or higher, and still more preferably is 944 kg/m³ or higher.

Furthermore, the density of the polymer preferably is 970 kg/m³ or lower, and more preferably is 960 kg/m³ or lower.

In a preferred embodiment, the ethylene homo- or copolymer used in the film of the invention comprises (A) a first ethylene homo- or copolymer fraction, and (B) a second ethylene homo- or copolymer fraction, wherein fraction (A) has a lower average molecular weight than fraction (B).

Where ever the term "molecular weight" is used herein, the weight average molecular weight is meant.

Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Preferably, the weight fraction of fraction (A) with regard to the total weight of fractions (A) and (B) is more than 40%, more preferably is more than 41% and still more preferably is 42% or more.

Furthermore, preferably the weight fraction of fraction (A) with regard to the total weight of fractions (A) and (B) is less than 60%, more preferably is less than 55% and still more preferably is 50% or less.

Fraction (A) preferably has an $MFR_2$ of 50 g/10 min or higher, more preferably of 100 g/10 min or higher and most preferably of 200 g/10 min or higher.

Furthermore, fraction (A) preferably has an $MFR_2$ of 2000 g/10 min or lower, more preferably of 1500 g/10 min or lower and most preferably of 1000 g/10 min or lower.

Fractions (A) and (B) may both be ethylene copolymers or ethylene homopolymers, although preferably at least one of the fractions is an ethylene copolymer.

Preferably, the composition comprises an ethylene homopolymer and an ethylene copolymer component.

Preferably, fraction (A) is an ethylene homo- or copolymer with a density of at least 965 kg/m³.

Where one of the components is an ethylene homopolymer, this is preferably the component with the lower molecular weight, i.e. fraction (A).

Preferably, fraction (B) is an ethylene homo- or copolymer with a density of less than 965 kg/m³.

Most preferably, fraction (B) is a copolymer. It may be noted that the term ethylene copolymer is used herein to relate to a polyethylene deriving from ethylene and one or more copolymerisable comonomers. Preferably, the copolymer component(s) of the composition of the invention will contain at least 0.01 mol %, more preferably at least 0.05 mol %, and most preferably at least 0.1 mol % of non-ethylene comonomer units. Furthermore, preferably the copolymer contains at most 5 mol % of such comonomer units, more preferably at most 2 mol %.

Preferred ethylene copolymers employ alpha-olefins (e.g. $C_{3-12}$ alpha-olefins) as comonomers. Examples of suitable alpha-olefins include but-1-ene, hex-1-ene and oct-1-ene. But-1-ene is an especially preferred comonomer.

The polyethylene resin may also contain minor quantities of additives such as pigments, nucleating agents, antistatic agents, fillers, antioxidants, processing aids, etc., generally in amounts of up to 10% by weight, preferably up to 5% by weight.

A multimodal (e.g. bimodal) polyethylene comprising fractions (A) and (B) as hereinbefore described may be produced by mechanical blending two or more polyethylenes (e.g. monomodal polyethylenes) having differently centred maxima in their molecular weight distributions. Blending may be carried out in any conventional blending apparatus.

The monomodal polyethylenes required for blending may be available commercially or may be prepared using any conventional procedure known to those skilled in the art. Each of the polyethylenes used in a blend and/or the final polymer composition may have the properties hereinbefore described for the lower molecular weight component, higher molecular weight component and the composition, respectively.

The polyethylene resin in the preferred embodiment where the resin comprises (A) a first ethylene homo- or copolymer fraction, and (B) a second ethylene homo- or copolymer fraction, wherein fraction (A) has a lower average molecular weight than fraction (B), preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Preferably, the multimodal polyethylene resin is produced by polymerisation using conditions which create a multimodal (e.g. bimodal) polymer product, e.g. using a catalyst system or mixture with two or more different catalytic sites, each site obtained from its own catalytic site precursor, or using a two or more stage, i.e. multistage, polymerisation process with different process conditions in the different stages or zones (e.g. different temperatures, pressures, polymerisation media, hydrogen partial pressures, etc).

Preferably, the multimodal (e.g. bimodal) resin is produced by a multistage ethylene polymerisation, e.g. using a series of reactors, with optional comonomer addition preferably in only the reactor(s) used for production of the higher/highest molecular weight component(s) or differing comonomers used in each stage.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Polymer resins produced in a multistage process are also designated as "in-situ"-blends.

Accordingly, it is preferred that fractions (A) and (B) of the polyethylene resin are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene resin.

Preferably, the main polymerisation stages of the multistage process for producing the resin are such as described in EP 517 868, i.e. the production of fractions (A) and (B) is carried out as a combination of slurry polymerisation for fraction (A)/gas-phase polymerisation for fraction (B).

The slurry polymerisation is preferably performed in a so-called loop reactor. Further preferred, the slurry polymerisation stage precedes the gas phase stage.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to EP 0 810 235. The content of this documents in its entirety is incorporated herein by reference, in particular concerning the general and all preferred embodiments of the catalysts described therein as well as the methods for the production of the catalysts.

The resulting end product consists of an intimate mixture of the polymers from the two or more reactors, the different molecular-weight-distribution curves of these polymers together forming a molecular-weight-distribution curve having a broad maximum or two or more maxima, i.e. the end product is a bimodal or multimodal polymer mixture.

It is preferred that the resin, i.e. the entirety of all polymeric constituents, of the composition according to the invention is a bimodal polyethylene mixture consisting of fractions (A) and (B), optionally further comprising a small prepolymerisation fraction in an amount of 10 wt % or below.

It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

In the production of the resin, preferably a compounding step is applied, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The present invention furthermore relates to an ethylene homo- or copolymer composition which has a complex viscosity at 5 kPa shear stress eta5 of 200,000 or less and a shear thinning index SHI(5/300) measured at 190° C. as the ratio between the complex viscosity at 5 kPa shear stress and the complex viscosity at 300 kPa shear stress of 120 or more, including any of the above-described preferred embodiments of the composition, and to the use of an ethylene homo- or copolymer which has a complex viscosity at 5 kPa shear stress eta5 of 200,000 or less and a shear thinning index SHI(5/300) measured at 190° C. as the ratio between the complex viscosity at 5 kPa shear stress and the complex viscosity at 300 kPa shear stress of more than 120 in any of the above described embodiments for the production of a film.

EXPERIMENTAL AND EXAMPLES

1. Definitions and Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A waters 150 CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

All densities are measured according to ISO 1183/D.

c) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

d) Shear Thinning Index SHI

Dynamic rheological measurements were carried out with a rheometer, namely Rheometrics RDA-II QC, on compression moulded samples under nitrogen atmosphere at 190° C. using 25 mm diameter plates and plate geometry 1.2 mm gap. The oscillatory shear experiments were done within the linear viscosity range of strain at frequencies from 0.05 to 300 rad/s (ISO 6721-1).

The values of storage modulus (G'), loss modulus (G") complex modulus (G*) and complex viscosity (eta*) were obtained as a function of frequency (omega). Eta(100 rad/s) is used as abbreviation for the complex viscosity at 100 rad/sec shear rate.

Shear thinning index (SHI), which is correlating with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

SHI value is obtained by calculating the complex viscosities $eta_{(5)}$ and $eta_{(300)}$ at a constant shear stress of 5 kPa and 300 kPa, respectively. The shear thinning index SHI(5/300) is defined as the ratio of the two viscosities $eta_{(5)}$ and $eta_{(300)}$.

The definitions and measurement conditions are also described in detail on page 8 line 29 to page 11, line 25 of WO 00/22040.

e) Dart Drop

The dart drop was measured on film samples having a thickness of 15 micrometer produced on an Alpine film line with a die diameter of 160 mm, a die gap of 1.5 mm, a blow-up ratio BUR of 4:1 and a neck height of 8× die diameter.

f) Gel Rating

The gel rating was observed visually from film samples. The samples were rated from -- (having an unacceptable high number of gels) to ++ (having no or only a small number of gels).

g) Elmendorf Tear Strength

Elmendorf tear strength was measured on film samples having a thickness of 15 micrometer produced on an Alpine film line with a die diameter of 160 mm, a die gap of 1.5 mm, a blow-up ratio BUR of 4:1 and a neck height of 8× die diameter in accordance with ISO 6383/2.

2. Produced Resins and Films

Five different polyethylene resins were produced according to the following procedure:

For all Examples 1 to 5 according to the invention, polymerisation was carried out in a 50 l prepolymerisation loop reactor, a 500 l main loop reactor and a gas phase reactor under the conditions as given in Table 1. As a catalyst, $MgCl_2$ supported Ziegler-Natta catalyst Lynx 200 available from Engelhard Corporation Pasadena, U.S.A. has been used.

The resins obtained were then extruded into pellets by using a JSW CIM90P extruder. The properties of resins 1 to 5 as well as that of comparative resins are listed in Table 1.

TABLE 1

| Example | 1 | 2 | 3 | 4 | 5 | Com. Ex. 1 | Com. Ex. 2 | Com. Ex. 3 |
|---|---|---|---|---|---|---|---|---|
| Prepolymerisation | | | | | | | | |
| Temp./° C. | 40 | 40 | 40 | 40 | 40 | | | |
| Press./bar | 61 | 62 | 62 | 62 | 61 | | | |
| Amount in total res./wt. % | 0.6 | 0.6 | 0.6 | 0.6 | 0.6 | | | |
| $H_2/C_2$ feed ratio g/kg (mol/kmol) | 5.0 (70.1) | 5.0 (70.0) | 5.0 (69.9) | 5.0 (70.5) | 5.0 (70.0) | | | |
| Main Loop Polymerisation | | | | | | | | |
| Temp./° C. | 95 | 95 | 95 | 95 | 95 | | | |
| Press./bar | 56 | 56 | 56 | 56 | 56 | | | |
| $H_2/C_2$/mol/kmol | 533 | 532 | 540 | 497 | 478 | | | |
| prod.rate/kg/h | 37 | 37 | 37 | 40 | 40 | | | |
| $MFR_2$/g/10 min | 500 | 600 | 700 | 630 | 540 | | | |
| Gas Phase Polymerisation | | | | | | | | |
| Temp./° C. | 95 | 95 | 95 | 95 | 95 | | | |
| Press./bar | 20 | 20 | 20 | 20 | 20 | | | |
| $H_2/C_2$/mol/kmol | 12 | 12 | 12 | 6 | 4 | | | |
| $C_4/C_2$/mol/kmol | 85 | 79 | 76 | 85 | 87 | | | |
| prod.rate/kg/h | 53 | 53 | 53 | 46 | 47 | | | |
| Amount in total res./wt. % | 58 | 58 | 58 | 54 | 54 | | | |
| comonomer | butene | butene | butene | butene | butene | | | |
| Resin Properties | | | | | | | | |
| comono. wt % | 1.8 | 1.8 | 1.7 | 1.6 | 1.7 | | | |
| Dens./kg/m³ | 945 | 946 | 946 | 947 | 947 | 946 | 947 | 946 |
| $MFR_5$/g/mol | 0.22 | 0.21 | 0.20 | 0.29 | 0.25 | 0.22 | 0.21 | 0.17 |
| $MFR_{21}$/g/mol | 6.6 | 6.4 | 6.0 | 9.8 | 8.4 | | | |
| $FRR_{21/5}$ | 30 | 30 | 30 | 34 | 34 | | | |
| eta5/Pa · s | 132,829 | 152,719 | 159,541 | 126,075 | 153,906 | 109,896 | 141,385 | 225,878 |
| eta300/Pa · s | 987 | 932 | 889 | 467 | 580 | 996 | 1233 | 1422 |
| SHI(5/300) | 135 | 164 | 179 | 270 | 265 | 110 | 90 | 159 |
| $M_w$/g/mol | | 355,000 | | | 335,000 | | | |
| $M_n$/g/mol | | 8,000 | | | 7,500 | | | |
| MWD | | 44 | | | 44 | | | |

The resins listed in Table 1 were extruded using the conditions as given in Table 2. Then, films were produced on an Alpine film line with a die diameter of 160 mm, a die gap of 1.5 mm, a blow-up ratio BUR of 4:1 and a neck height of 8× die diameter. The film properties were measured and are given in Table 3.

TABLE 2

|  | Temp./° C. | Melt Pressure 1/2*/bar | Motor Load | Thickn. Profile 2-sigma [%]1 |
|---|---|---|---|---|
| Ex. 1 | 223 | 402/348 | 57 | 22 |
| Ex. 2 | 223 | 412/353 | 58 | 16 |
| Ex. 3 | 224 | 406/349 | 57 | 18 |
| Ex. 4 | 213 | 363/310 | 54 | 19 |
| Ex. 5 | 217 | 377/325 | 56 | 21 |
| Comp. Ex. 1 | 231 | 425/368 | 60 | 41 |
| Comp. Ex. 2 | 226 | 436/372 | n.a. | n.a. |
| Comp. Ex. 3 | 228 | 504/431 | n.a. | 12.2 | n.a. = not available,
*melt pressure 1: before Screen Pack, melt pressure 2: after Screen Pack

TABLE 3

|  | Gel rating | Dart Drop [g] | Elmendorf Tear MD/TD |
|---|---|---|---|
| Ex. 1 | + | 440 | 0.11/1.10 |
| Ex. 2 | + | 360 | 0.11/1.80 |
| Ex. 3 | + | 390 | 0.11/1.30 |
| Ex. 4 | + | 340 | 0.12/1.30 |
| Ex. 5 | + | 380 | 0.12/1.50 |
| Comp. Ex. 1 | + | 240 | 0.08/0.90 |
| Comp. Ex. 2 | + | 540 | 0.12/1.8 |
| Comp. Ex. 3 | + | 202 | 0.26/n.a. |

From the extrusion conditions as given in Table 2 and the film properties as given in Table 3 it can be seen that in the Examples according to the invention, a broad split has been applied, meaning that less HMW material is used to produce a final resin with a reference MFR. This is usually (i.e. in prior art materials) giving a very high amount of gels due to the higher molecular weight of the HMW component required to reach the reference MFR. However, such formation of gels is not observed for the films in accordance with the invention, indicating an improved homogeneity.

In addition, the materials of the invention show a significant reduction in melt pressure and film thickness distribution, which e.g. is an advantage for the converter, giving increased film line output and appearance.

The invention claimed is:

1. A film comprising at least one layer comprising an ethylene homo- or copolymer which has a complex viscosity at 5 kPa shear stress eta5 of 200,000 or less and a shear thinning index SHI(5/300) measured at 190° C. as the ratio between the complex viscosity at 5 kPa shear stress and the complex viscosity at 300 kPa shear stress of 120 or more.

2. A film according to claim 1 wherein the ethylene homo- or copolymer has a melt flow rate MFR5 of at least 0.1 g/10 min.

3. A film according to claim 1 wherein the ethylene homo- or copolymer has a melt flow rate $MFR_5$ of 0.5 g/10 min or less.

4. A film according to claim 1 wherein the film has a dart drop value of more than 200 g if the film is extruded on an Alpine film line into a thickness of 15 micrometer with a die diameter of 160 mm, a die gap of 1.5 mm, a blow-up ratio BUR of 4:1 and a neck height of 8× die diameter.

5. A film according to claim 1 wherein the ethylene homo- or copolymer has a density of 940 kg/m³ or higher.

6. A film according to claim 1 wherein the ethylene homo or copolymer comprises
(A) a first ethylene homo- or copolymer fraction, and
(B) a second ethylene homo- or copolymer fraction
wherein fraction (A) has a lower average molecular weight than fraction (B).

7. A film according to claim 6 wherein the weight fraction of fraction (A) with regard to the total weight of fractions (A) and (B) is more than 40%.

8. A film according to claim 6 wherein fraction (A) has an $MFR_2$ of 50 g/10 min to 2000 g/10 min.

9. A film according to claim 6 wherein fraction (A) is an ethylene homopolymer.

10. A film according to claim 6 wherein fraction (B) is an ethylene copolymer with 0.01 mol % to 5 mol % of an alpha-olefin comonomer.

11. A film according to claim 6 wherein the ethylene homo- or copolymer is produced in a multistage reaction.

12. A film according to claim 1 wherein the film has an Elmendorf tear strength in the machine direction of at least 0.09.

13. A film according to claim 2 wherein the ethylene homo- or copolymer has a melt flow rate $MFR_5$ of 0.5 g/10 min or less.

14. A film according to claim 2 wherein the film has a dart drop value of more than 200 g if the film is extruded on an Alpine film line into a thickness of 15 micrometer with a die diameter of 160 mm, a die gap of 1.5 mm, a blow-up ratio BUR of 4:1 and a neck height of 8× die diameter.

15. A film according to claim 2 wherein the ethylene homo- or copolymer has a density of 940 kg/m³ or higher.

16. A film according to claim 2 wherein the ethylene homo or copolymer comprises
(A) a first ethylene homo- or copolymer fraction, and
(B) a second ethylene homo- or copolymer fraction
wherein fraction (A) has a lower average molecular weight than fraction (B).

17. A film according to claim 7 wherein fraction (A) has an $MFR_2$ of 50 g/10 min to 2000 g/10 min.

18. A film according to claim 7 wherein fraction (A) is an ethylene homopolymer.

19. A film according to claim 8 wherein fraction (A) is an ethylene homopolymer.

* * * * *